(12) United States Patent
Shin et al.

(10) Patent No.: US 10,895,790 B2
(45) Date of Patent: Jan. 19, 2021

(54) DISPLAY DEVICE

(71) Applicant: SAMSUNG DISPLAY CO., LTD, Yongin-si (KR)

(72) Inventors: Dong Hee Shin, Asan-si (KR); Yoo Mi Ra, Ansan-si (KR); Soo Hong Cheon, Seoul (KR)

(73) Assignee: Samsung Display Co., Ltd., Yongin-si (KR)

( * ) Notice: Subject to any disclaimer, the term of this patent is extended or adjusted under 35 U.S.C. 154(b) by 0 days.

(21) Appl. No.: 16/437,823

(22) Filed: Jun. 11, 2019

(65) Prior Publication Data

US 2020/0081289 A1 Mar. 12, 2020

(30) Foreign Application Priority Data

Sep. 7, 2018 (KR) .................. 10-2018-0107006

(51) Int. Cl.
*G02F 1/1345* (2006.01)
*G02F 1/1362* (2006.01)
*G02F 1/1339* (2006.01)

(52) U.S. Cl.
CPC ........ *G02F 1/13454* (2013.01); *G02F 1/1339* (2013.01); *G02F 1/136209* (2013.01); *G02F 1/136286* (2013.01); *G02F 2201/121* (2013.01)

(58) Field of Classification Search
None
See application file for complete search history.

(56) References Cited

U.S. PATENT DOCUMENTS

| 9,208,738 | B2 | 12/2015 | Kwon et al. | |
|---|---|---|---|---|
| 2011/0074743 | A1* | 3/2011 | Son | G09G 3/20 345/204 |
| 2011/0304604 | A1* | 12/2011 | Jo | G09G 5/00 345/212 |
| 2018/0061307 | A1 | 3/2018 | Inoue et al. | |

FOREIGN PATENT DOCUMENTS

| KR | 10-1424283 | 8/2014 |
|---|---|---|
| KR | 10-1598951 | 3/2016 |

* cited by examiner

*Primary Examiner* — Stephen T. Reed
(74) *Attorney, Agent, or Firm* — Lewis Roca Rothgerber Christie LLP

(57) ABSTRACT

A display device includes: a display panel including a display area in which a plurality of pixels are arranged and a non-display area around the display area. The display panel includes: a first substrate; a plurality of gate lines on the first substrate and configured to gate signals to a plurality of pixels; a gate driver on the first substrate, the gate driver including a plurality of stages configured to generate the gate signals to output them to the gate lines; a clock signal line group on the first substrate and including a plurality of clock signal lines configured to transmit clock signals to the stages; a second substrate facing the first substrate; and a common electrode on the second substrate, the common electrode having an opening overlapping the clock signal line group, and a width of the opening being greater than that of the clock signal line group.

20 Claims, 12 Drawing Sheets

DISPLAY DEVICE

CROSS-REFERENCE TO RELATED APPLICATION

This application claims priority to and benefit of Korean Patent Application No. 10-2018-0107006 filed in the Korean Intellectual Property Office on Sep. 7, 2018 the entire contents of which is incorporated herein by reference.

BACKGROUND

1. Field

Embodiments of this disclosure relate to a display device.

2. Description of the Related Art

A display device, such as a liquid crystal display device (LCD) and an organic light emitting diode (OLED) display, includes a display panel on which an image is displayed, a gate driver for driving the display panel, and a driver such as a data driver. The driver may be formed as a separate chip, and may be electrically coupled to the display panel. Recently, a technique of integrating the gate driving unit on a display panel without forming it as a chip has been used.

The gate driver includes a transistor serving as a switching element and a capacitor serving as a storage element. When the gate driver is integrated in the display panel, the gate driver may be in a peripheral area of the display panel, e.g., outside the display area in which an image is displayed. Signals used for generating a gate signal, including a gate-on voltage and a gate-off voltage, are applied to the gate driver, and signal lines carrying these signals may also be formed in the non-display area.

The delay of the gate signal outputted from the gate driver may occur due to RC delay caused by signal lines such as, for example, a clock signal line through which a clock signal is transferred. The delay of the gate signal may cause the charge time of the pixel to decrease and cause crosstalk, thereby deteriorating the display quality.

The above information disclosed in this Background section is only for enhancement of understanding of the background of the present disclosure and therefore it may contain information that does not form the prior art that is already known in this country to a person of ordinary skill in the art.

SUMMARY

Embodiments provide a device capable of reducing a load of a clock signal and a delay of a gate signal.

An exemplary embodiment provides a display device including a display panel including a display area in which a plurality of pixels are arranged, and a non-display area around the display area. The display panel includes: a first substrate; a plurality of gate lines on the first substrate, the plurality of gate lines being configured to transfer gate signals to the pixels; a gate driver on the first substrate, the gate driver including a plurality of stages configured to generate the gate signals to output them to the gate lines; a clock signal line group on the first substrate and including a plurality of clock signal lines configured to transmit clock signals to the stages; a second substrate facing the first substrate; and a common electrode on the second substrate, wherein the common electrode has an opening overlapping the clock signal line group, and a width of the opening is greater than that of the clock signal line group.

The opening may overlap a portion of the clock signal line group that extends in parallel with the gate driver.

The opening may have a rectangular shape having a long side that extends in parallel with the gate driver.

The gate driver may extend in a first direction, and the clock signal lines may be separated by a set (e.g., predetermined) interval in a second direction that intersects the first direction. A distance in the second direction between the common electrode and the clock signal line farthest from the gate driver among the clock signal lines may be 20 μm or more. A distance in the second direction between the common electrode and a clock signal line closest to the gate driver among the clock signal lines may be 20 μm or more.

The display panel may further include a sealant between the first substrate and the second substrate and bonding the first substrate and the second substrate. The sealant may completely cover the opening.

The display panel may further include a light blocking member on the second substrate, and the light blocking member may overlap the opening and may have a width that is greater than that of the opening.

The light blocking member may be between the second substrate and the common electrode, and a top surface of the sealant may contact the light blocking member in a region where the sealant overlaps the opening.

The display panel may further include a liquid crystal layer between the first substrate and the second substrate, and the liquid crystal layer may be spaced apart from the opening.

The display panel may further include a plurality of connection lines coupling the clock signal lines and the stages. At least one of the connection lines may include a resistance adjusting part between the clock signal line group and the gate driver.

The display panel may further include a signal line that transfers a low voltage to the gate driver. The resistance adjusting part may be between the clock signal line group and the signal line.

The opening may be formed up to one end of the second substrate.

An exemplary embodiment provides a display device including: a first substrate; a gate driver longitudinally arranged on the first substrate in a first direction, the gate driver being configured to generate and output a gate signal; a clock signal line group including a plurality of clock signal lines on the first substrate and extending in the first direction; a second substrate facing the first substrate; a common electrode on the second substrate to have an opening; and a liquid crystal layer between the first substrate and the second substrate. A width of the opening is greater than that of the clock signal line group in a second direction that intersects the first direction.

The opening may overlap the clock signal line group.

The opening may overlap a portion of the clock signal line group that extends in parallel with the gate driver in the first direction.

The opening may have a rectangular shape having a long side that extends in the first direction.

A distance in the second direction between the common electrode and the clock signal line farthest from the gate driver among the clock signal lines may be 20 μm or more, and a distance in the second direction between the common electrode the clock signal line closest to the gate driver may be 20 μm or more.

The display device may include a sealant that bonds the first substrate and the second substrate. The sealant may completely cover the opening.

The display device may include a light blocking member between the second substrate and the common electrode. The light blocking member may overlap the opening.

A top surface of the sealant may contact the light blocking member in a region where the sealant overlaps the opening.

According to the exemplary embodiments, it is possible to ameliorate or reduce a delay of the gate signals, thereby ensuring reliability and an operating margin of the gate driver and improving a charge rate of the pixels. The display device according to the embodiments can meet various demands such as those for a large display panel, a high resolution, and a narrow bezel.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1:
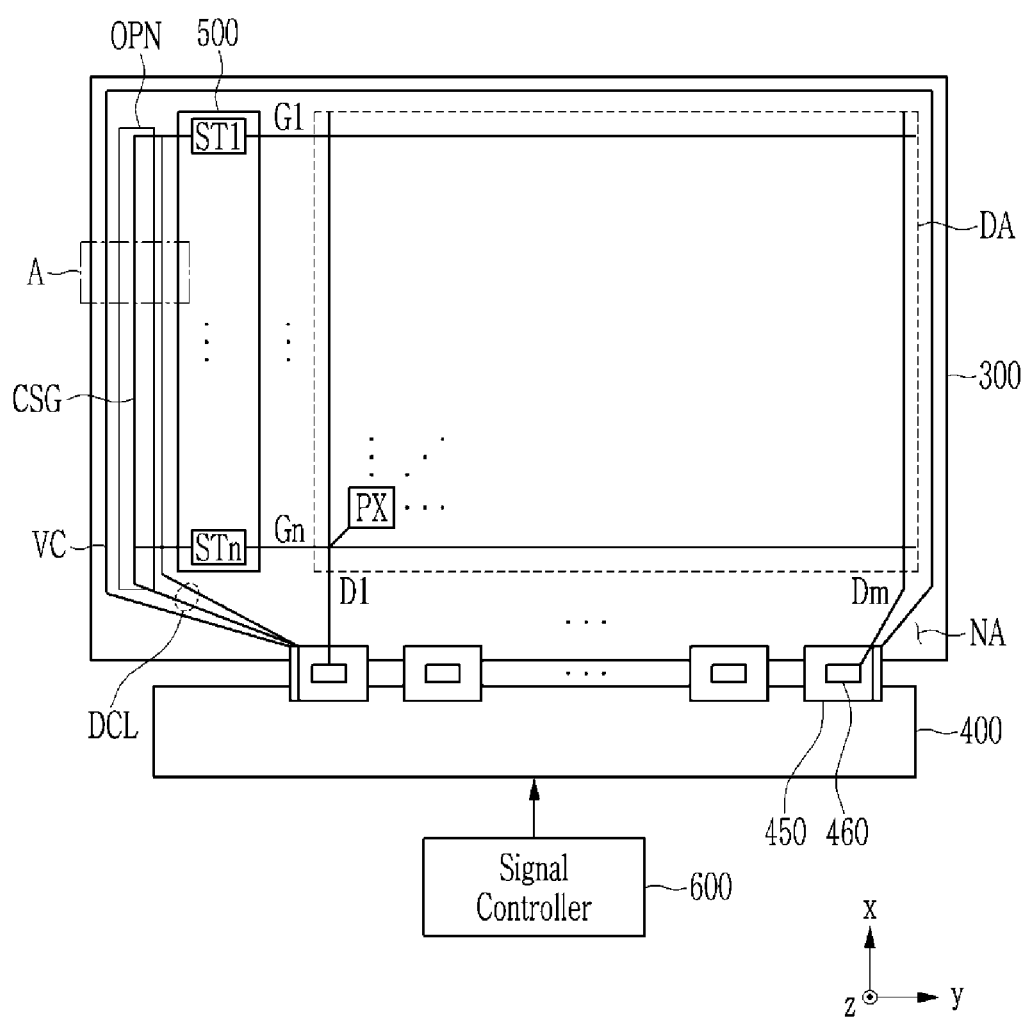
FIG. 1 schematically illustrates a display device according to an exemplary embodiment.

Embodiments of the present disclosure will be described more fully hereinafter with reference to the accompanying drawings, in which exemplary embodiments of the present disclosure are shown. As those skilled in the art would realize, the described embodiments may be modified in various different ways, all without departing from the spirit or scope of the present disclosure.

Like reference numerals designate like elements throughout the specification. In the drawings, the thickness or sizes of respective layers and areas may be enlarged or reduced to clearly illustrate their arrangements and relative positions.

It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, unless explicitly described to the contrary, the word "comprise" and variations such as "comprises" or "comprising" will be understood to imply the inclusion of stated elements but not the exclusion of any other elements.

Further, in the specification, the phrase "in a plan view" means when an object portion is viewed from above, and the phrase "in a cross-sectional view" means when a cross-section taken by vertically cutting an object portion is viewed from the side.

A display device according to exemplary embodiments of the present disclosure will now be described in more detail with reference to the accompanying drawings. Although a liquid crystal display will be mainly described, the subject matter of the present disclosure may be applied to a display device other than the liquid crystal display.

FIG. 1 schematically illustrates a display device according to an exemplary embodiment.

Referring to FIG. 1, the display device includes a display panel 300, a data driver 460, a gate driver 500, and a signal controller 600.

The display panel 300 includes a display area DA configured to display an image, and a non-display area NA around the display area DA. In the display panel 300, various elements and wires that are used to receive signals from the outside and display an image are formed on a substrate.

Pixels PX configured to display an image are in the display area DA, and data lines D1 to Dm and gate lines G1 to Gn configured to apply signals to the pixels PX are arranged therein. The data lines D1 to Dm extend in a first direction x and the gate lines G1 to Gn extend in a second direction y. The gate lines G1 to Gn and the data lines D1 to Dm may be insulated from each other.

In the case of a liquid crystal display, a pixel PX includes a transistor, a liquid crystal capacitor, and a storage capacitor. The liquid crystal capacitor may include a pixel electrode, a common electrode, and a liquid crystal layer. A control electrode (which may be referred to as a control terminal, a gate electrode, or the like) of the transistor may be coupled to (e.g., connected to) a gate line, a first electrode of the transistor (which may be referred to as an input terminal or a source electrode) may be coupled to a data line, and a second electrode (which may be referred to as an output terminal, a drain electrode, or the like) may be coupled to the pixel electrode of the liquid crystal capacitor and a first electrode of the storage capacitor. The common electrode of the liquid crystal capacitor may receive a common voltage, and the second electrode of the storage capacitor may receive a storage voltage.

A gate driver 500 is located in the non-display area NA and is configured to apply a gate signal to the gate lines G1 to Gn. The gate driver 500 may be integrated in the non-display area NA. The gate driver 500 may be formed to extend in the first direction x. The data lines D1-Dm of the display area DA may receive a data signal, e.g., a data voltage applied to the pixel PX, from a data driver, which may be an integrated circuit (IC) chip mounted on a flexible printed circuit board (FPCB) 450 bonded to the display panel 300.

The gate driver 500 and data driver 460 may be controlled by the signal controller 600. A printed circuit board (PCB) 400 is outside of the FPCB 450 to transfer signals outputted from the signal controller 600, to the data driver 460 and the gate driver 500. Signals supplied from the signal controller 600 to the gate driver 500 are transferred to the gate driver 500 through a driver control signal line DCL in the display panel 300. A signal supplied to the gate driver 500 through the DCL in the signal controller 600 may include signals such as a vertical start signal and a clock signal, and signals supplying a low voltage of a certain level. Some signals may be supplied from a device other than the signal controller 600.

The driver control signal line DCL may be coupled to, e.g., the FPCB 450 close to the gate driver 500

The driver control signal line DCL may extend, e.g., in parallel (e.g., substantially in parallel) with the gate driver 500 in the non-display area NA. For example, the driver control signal line DCL and the gate driver 500 may extend in the first direction x. However, a portion of the driver control signal line DCL below the gate driver 500 may extend in a different direction from the first direction x, for example, in an oblique direction.

Two lines are illustrated as the driver control signal lines in FIG. 1 to avoid complication of the drawing, but the driver control signal line may include a number of signal lines corresponding to signal types (or kinds), or may include more or fewer signal lines compared therewith. The signal lines of the driver control signal line DCL may be arranged in parallel (e.g., substantially in parallel) with the gate driver 500 in a more outer circumference from the display area DA than the gate driver 500, but the arrangement of signal lines is not limited thereto. For example, a signal line (e.g., a signal line carrying a first low voltage) may be between the gate driver 500 and the display area DA, and a signal line may pass through the gate driver 500.

The gate driver 500 receives a low voltage corresponding to a vertical start signal, clock signals, and a gate-off voltage through the driver control signal line DCL to generate a gate signal (a gate-on voltage or a gate-off voltage) and apply it to the gate lines G1 to Gn. The clock signals are transferred through a clock signal line group CSG in the driver control signal line DCL. The clock signal line group CSG may be at a more outer circumference of the display panel 300 than the gate driver 500.

Although the clock signal line group CSG is illustrated as one line, the clock signal line group CSG may include a number of clock signal lines corresponding to the number of clock signals transmitted to the gate driver 500. The gate driver 500 includes stages ST1 to STn configured to generate and output gate signals using these signals. The stages ST1 to STn are coupled with the gate lines G1 to Gn in a one-to-one relationship. The stages ST1 to STn may be coupled in a dependent manner, and may sequentially output gate signals to the gate lines G1 to Gn for each frame. Stages ST1 to STn sequentially output n gate signals from gate lines G1 to Gn sequentially from the first stage ST1 to the $n^{th}$ stage STn, or conversely, sequential output from the $n^{th}$ stage STn to the first stage ST1 is possible.

The gate driver 500 may be at a left and/or right side of the display area, and may be at an upper side and/or a lower side thereof. The gate driver 500 is at the left side of the display area DA in the illustrated exemplary embodiment, but may be at the left side thereof.

Each stage includes transistors and at least one capacitor. A region occupied by each stage may be approximately rectangular. Accordingly, it is illustrated in FIG. 1 that each of the stages is a rectangular block having same the areas and shapes.

A common voltage line VC is in the non-display area NA of the display panel 300. The common voltage line VC may be at the outer circumference of the display panel 300 outside the driving control signal line DCL, to surround an edge of the display panel 300. The common voltage line VC may transmit a common voltage inputted into the common electrode through the flexible printed circuit board (FPCB) 450 or the like.

Figure 2:
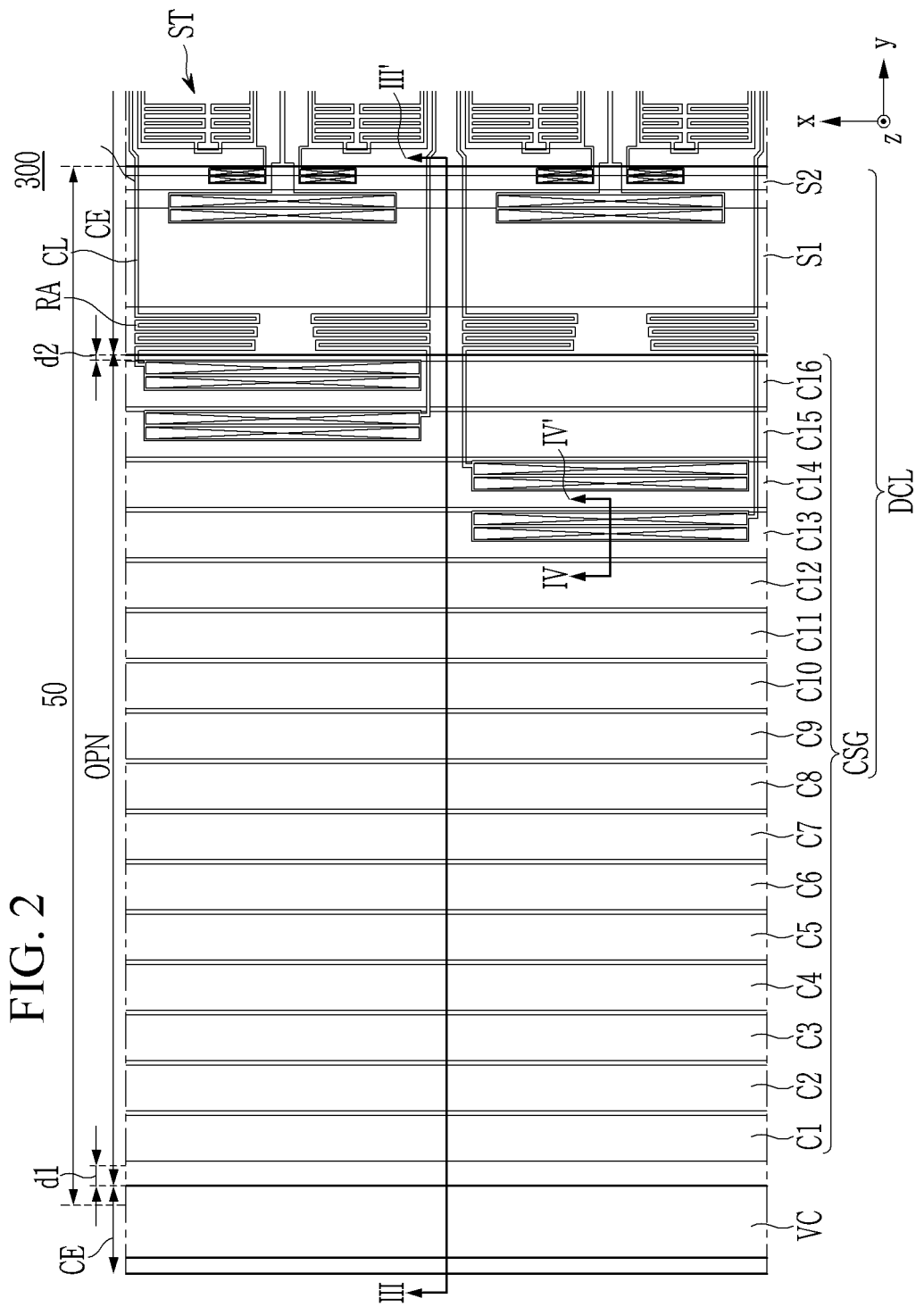
FIG. 2 illustrates an enlarged view of a region A of FIG. 1 according to an exemplary embodiment.
Figure 3:
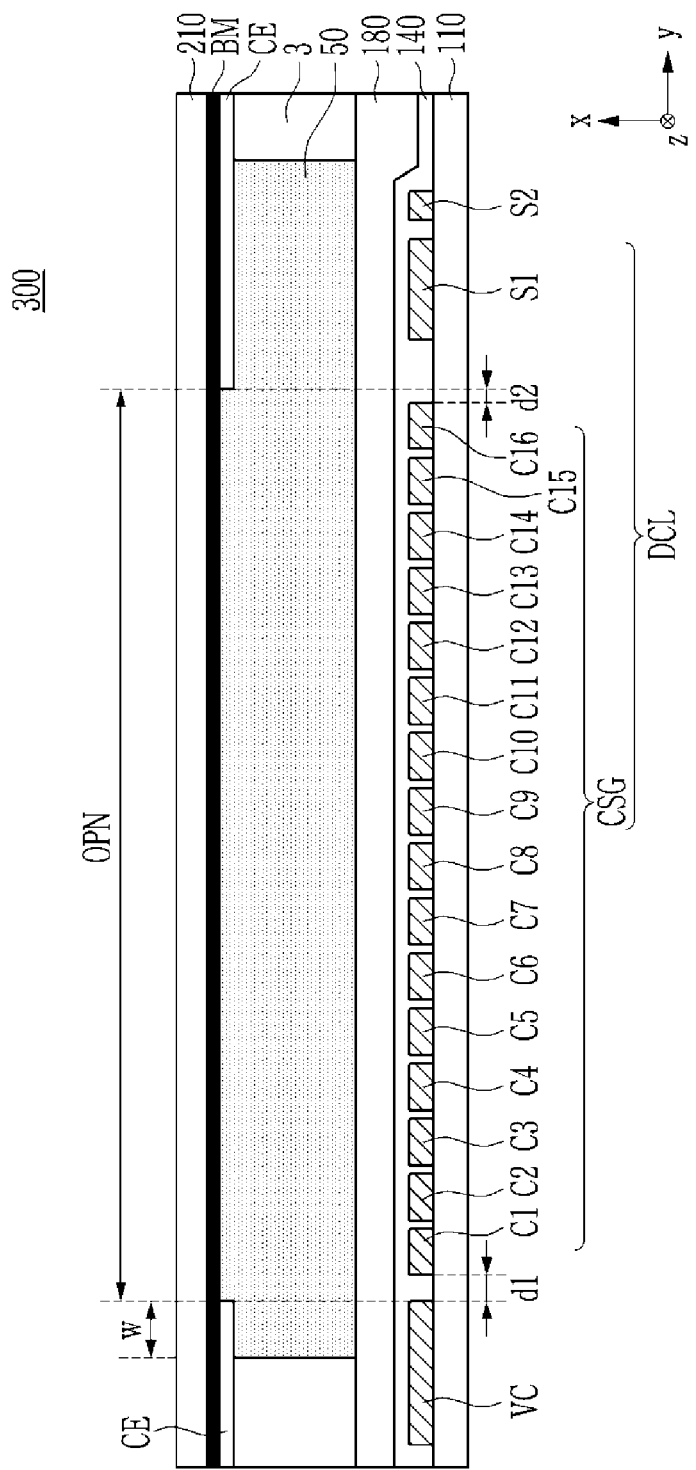
FIG. 3 illustrates a cross-sectional view taken along a line III-III' of FIG. 2.
Figure 4:
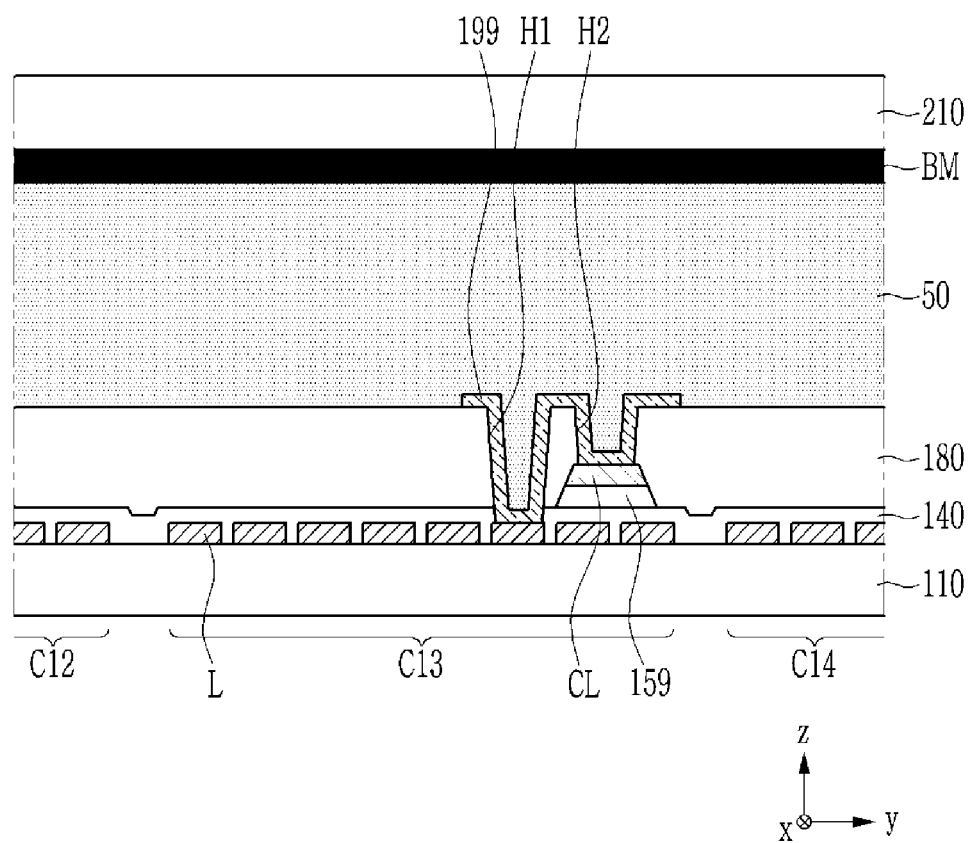
FIG. 4 illustrates a cross-sectional view taken along a line IV-IV' of FIG. 2.
Figure 5:
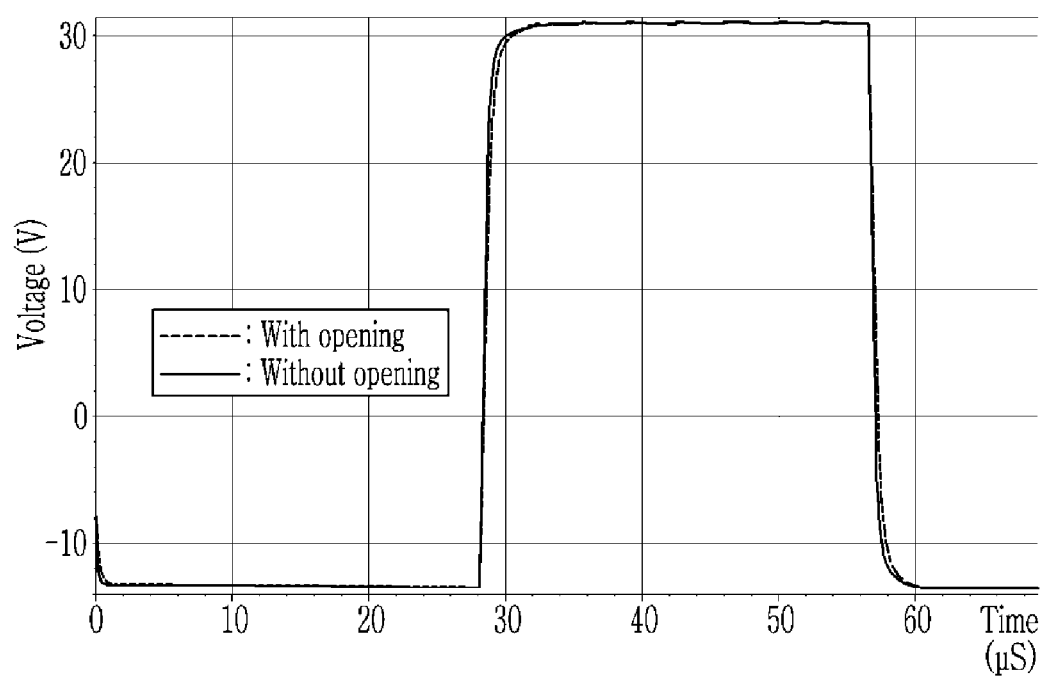
FIG. 5 is a graph illustrating a waveform of a gate signal according to an exemplary embodiment.

FIG. 2 illustrates an enlarged view of a region A of FIG. 1 according to an exemplary embodiment, FIG. 3 illustrates a cross-sectional view taken along a line III-III' of FIG. 2, and FIG. 4 illustrates a cross-sectional view taken along a line IV-IV' of FIG. 2. FIG. 5 is a graph illustrating a waveform of a gate signal according to an exemplary embodiment.

An end portion of the display panel 300 at which the gate driver 500 is located is illustrated in further detail in FIG. 2 and FIG. 3. Four stages ST are briefly and partially illustrated for the stages ST1 to STn included in the gate driver 500.

The display panel 300 includes a first substrate 110 and a second substrate 210 facing each other. A liquid crystal layer 3 may be on the first substrate 110 and the second substrate 210. The first substrate 110 and the second substrate 210 are bonded together by a sealant 50 therebetween. The sealant 50 may be in the non-display area NA around the display area DA. The sealant 50 may prevent or reduce escape of a liquid crystal material of the liquid crystal layer 3 to the outside of the display panel 300 or may prevent or reduce the penetration of impurities such as moisture and oxygen into the liquid crystal layer 3 from the outside.

The common voltage line VC is on the first substrate 110, and the control signal line DCL including the clock signal line group CSG, a signal line configured to transfer a low voltage, a signal line S2 configured to transfer a vertical start signal, and the like are also thereon. The clock signal line group CSG includes a plurality of clock signal lines C1 to C16. The clock signal line group CSG may include 16 clock signal lines C1 to C16, and the clock signal lines C1 to C16 may extend in parallel (e.g., substantially in parallel) with each other in the first direction x. The clock signal lines C1 to C16 may each have a same (e.g., substantially the same) width, and may be equally spaced (e.g., may be spaced apart from one another by the same or substantially the same distance).

Among the clock signal lines C1 to C16, the clock signal line C1 is farthest from the gate driver 500, and the clock signal line C16 is closest to the gate driver 500. Clock signals that are sequentially delayed in phase by, e.g., one horizontal period (1H) through the clock signal lines C1 to C16 may be transferred to the gate driver 500. The stages ST1 to STn of the gate driver 500 are coupled to the clock signal lines C1 to C16 in a repeated period of 16 consecutive stages to receive clock signals.

Each clock signal may have a pulse width (high level) of 8H. Each clock signal can have a duty ratio of 50%, and a period of 16H. In this case, each of the stages ST1 to STn of the gate driver 500 may output a gate-on voltage having a width of 8H, and gate-on voltages outputted from the adjacent stages ST1 to STn are overlapped with each other for 7H. When a plurality of clock signals are used to generate the gate signals, a period for which the gate-on voltage of the gate signal applied to each gate line G1 to Gn may be increased to increase a charging time of a pixel in the liquid crystal display.

According to another exemplary embodiment, fewer than 16 clock signals may be used, and thus the first substrate 110 may include fewer or more than 16 clock signal lines, e.g., 4, 6, 8, 10, or 12 clock signal lines thereon.

A first insulating layer 140 may be on the common voltage line VC and the driver control signal line DCL, and a second insulating layer 180 may be on the first insulating layer 140.

A light blocking member BM is on the second substrate 210, and a common electrode CE is on the light blocking member BM. Herein, being on the second substrate 210 indicates being on a surface which faces the first substrate 210, among surfaces of the second substrate 210.

The light blocking member BM may be formed to cover the driver control signal line DCL, the common voltage line VC, the gate driver 500, and the like in the non-display area NA. The light blocking member BM may be formed so as to cover at least a part of the region excluding the pixel PX in the display region DA. The common electrode CE may be arranged to entirely cover the second substrate 210, but the common electrode CE has an opening OPN formed in a region overlapping the clock signal line group CSG. For example, the common electrode CE may not be formed in the region overlapping the clock signal line group CSG.

Referring to FIG. 1, the opening OPN may be formed to overlap a portion of the clock signal line group CSG which extends in parallel (e.g., substantially in parallel) with at least the gate driver 500 in the first direction x. The opening OPN may have a substantially rectangular shape having long sides that extend in parallel (e.g., substantially in parallel) with the gate driver 500. When the common electrode CE overlaps the clock signal line group CSG, the voltage of the common electrode CE may affect the clock signals transferred through the clock signal line group CSG. For example, a load of the clock signals may increase due to capacitance between the common electrode CE and the clock signal line group CSG. This increases an RC delay of the clock signals, which may affect an output waveform of the gate driver 500 and resultantly deteriorate or reduce a charge rate of the pixels. According to an exemplary embodiment, the common electrode CE is removed from the region overlapping the clock signal line group CSG, thus reducing the capacitance between the common electrode CE and the clock signal line group CSG, thereby reducing the load on the clock signals. Therefore, the margin of the gate driver 500 may be secured, and the charge rate of the pixels may be increased.

According to a simulation result, in an 82-inch QUHD (7680×4320 pixels) liquid crystal panel, when the common electrode CE included an opening OPN overlapping the clock signal line group CSG, the common electrode CE did not include the opening OPN, and the clock signal load was reduced by about one third (from about 13 pF to about 4.2 pF) compared with the case of completely overlapping the line group CSG. As a result, referring to FIG. 5, in the case of including the opening OPN, a rising time and a falling time of the gate-on voltage from the gate signal outputted from the gate driver 500 are faster than the case of not including the opening OPN. For reference, FIG. 5 illustrates a waveform of a gate signal outputted from a last stage STn.

A width of the opening OPN of the common electrode CE may be greater than that of the clock signal line group CSG in order to minimize or reduce an effect of the common electrode CE on the clock signal line group CSG, for example, the clock signal lines C1 and C16 at opposite ends thereof. Herein, the width of clock signal line group CSG indicates a distance between a left side of the leftmost clock signal line C1 and a right side of the rightmost clock signal line C16 among the clock signal lines C1 to C16. A portion of the clock signal line group CSG extending in the first direction x may be within the opening OPN.

The width of the opening OPN may be greater than the width of the clock signal line group CSG by about 40 μm or more. For example, in a plan view, a distance d1 in the second direction y between the clock signal line C1 and the common electrode CE may be greater than about 20 μm, and a distance d2 in the second direction y between the clock signal line C16 and the common electrode CE may be greater than about 20 μm. When the distances d1 and d2 are less than 20 μm, a difference between a capacitance between the common electrode CE and the clock signal lines C1 and C16 and a capacitance between the common electrode CE and the other clock signal lines C2 to C15 may be increased to affect the display quality. For example, a difference may occur between loads of clock signals transferred through the clock signal lines C1 and C16 and loads of clock signals transferred through the clock signal lines C2 to C15, and waveforms of gate signals outputted from stages that receive the clock signals transferred through the clock signal lines C1 and C16 may be different from those of gate signals outputted from stages that receive the clock signals transferred through the clock signal lines C2 to C15. This can result in a charge-to-charge difference between pixels coupled to certain gate lines and pixels coupled to other gate lines, leading to luminance non-uniformity of the pixels.

The sealant 50 overlaps the clock signal line group CSG and also overlaps the opening OPN of the common electrode CE. The sealant 50 is formed to completely cover the opening OPN. A top surface of the sealant 50 may contact the light blocking member BM in a region where the sealant 50 and opening OPN are overlapped with each other. If the opening OPN is not provided, a portion of the light blocking member BM on the second substrate 210 which is covered by the common electrode CE is covered by the sealant 50, and thus the light blocking member BM may not contact a liquid crystal material, thereby preventing or reducing contamination of the liquid crystal material by a reaction between the light blocking member BM and the liquid crystal material. In a plan view, a width w of an overlapped portion of the sealant 50 and the common electrode CE may be designed to be about 400 μm or more. This is a width considering a process deviation when the sealing material 50 is formed and/or when the first substrate 110 and the second substrate 210 are bonded together.

The sealant 50 may be formed of a photo-curable sealing material or a thermosetting sealing material. For example, the sealant 50 may be formed by drawing a sealing material on one of the first substrate 110 and the second substrate 210 and dripping a liquid crystal material onto the other substrate and then bonding the first substrate 110 and the second substrate 210, and curing the sealing material by irradiating heat or light such as ultraviolet rays.

When the sealant 50 is formed of the photo-curable sealing material, light such as ultraviolet rays or heat needs to reach the sealing material in order for the sealing mater to be irradiated. However, since the light blocking member BM is in the second substrate 210, it is difficult for light irradiated from the second substrate 210 to reach the sealing material. Since the clock signal line group CSG and the like are on the first substrate 110, most of the light may be blocked by the clock signal line group CSG even if the first substrate 110 is irradiated with light. Accordingly, each of the clock signal lines C1 to C16 may be formed as a plurality of lines L spaced from each other. In one clock signal line, the lines L may be coupled in places in a horizontal direction. As such, when the clock signal lines C1 to C16 are formed by using the lines L, the light may be irradiated to the sealing material through gaps between the lines L, and may also reach the sealing material by a diffraction phenomenon. Accordingly, light capable of curing the sealing material may be entirely irradiated to the sealing material. For the same purpose, the signal lines (e.g., the signal lines S1 and S2, and the common voltage line VC) overlapping the sealant 50 may be formed as a plurality of lines in addition to the clock signal lines C1 to C16.

Since the clock signal line group CSG and the gate driver 500 extend in parallel (e.g., substantially in parallel) to each other in the first direction x, the clock signal lines C1 to C16 and the stages ST1 to STn are coupled with connection lines CL extending substantially in the second direction y. The clock signal lines C1 to C16 and the stages ST1 to STn may be electrically coupled to (e.g., electrically connected to) each other through the connection lines CL. FIG. 4 illustrates connection between the clock signal line C13 and the connection line CL, and other clock signals C1 to C12 and C14 to C16 may be coupled with the connection lines CL in the manner illustrated in FIG. 4. The connection line CL may be between the first insulating layer 140 and the second insulating layer 180, and a connector 199 on the second insulating layer 180 may be used for connection between the connection line CL and the clock signal line C13. The connector 199 may be coupled to the clock signal line C13 through a contact hole H1 formed in the first insulating layer 140 and the second insulating layer 180, and may be coupled to the connection line CL through a contact hole H2 formed in the second insulating layer 180. A semiconductor line 159 that is formed in a same or substantially the same pattern as the connection line CL to overlap the connection line CL may be below the connection line CL.

Since distances between the gate driver 500 and the individual clock signal lines C1 to C16 of the clock signal line group CSG are different from each other, lengths of the connection lines CL are different in the connection therebetween made by the connection lines CL, thereby generating a resistance difference and an RC delay difference caused by the resistance difference. The connection lines CL may include a resistance adjusting part between the clock signal line group CSG and the stages ST1 to STn to prevent or reduce a resistance difference between the connection lines CL coupled to the clock signal lines C1 to C16. In the present exemplary embodiment, the resistance adjusting part RA is between the clock signal line group CSG and the signal line S1 transferring a low voltage. The resistance adjusting part RA may be arranged longitudinally in the connection lines CL coupled to the clock signal lines C1 to C16 close to the stages ST1 to STn as compared with the connection lines CL coupled to the clock signal lines C1 to C16 far away from the stages ST1 to STn. Therefore, the resistance adjusting part RA of the connection line CL coupled to the clock signal line C16 may have a longest length. The connection line CL coupled to the clock signal line C1 farthest from the stages ST1 to STn may not include the resistance adjusting part RA or may include a resistance adjusting part RA having a shortest length. The resistance adjusting part RA may not overlap the opening OPN so that the design of the resistance adjusting part RA is free from the effect of the opening OPN.

Figure 6:
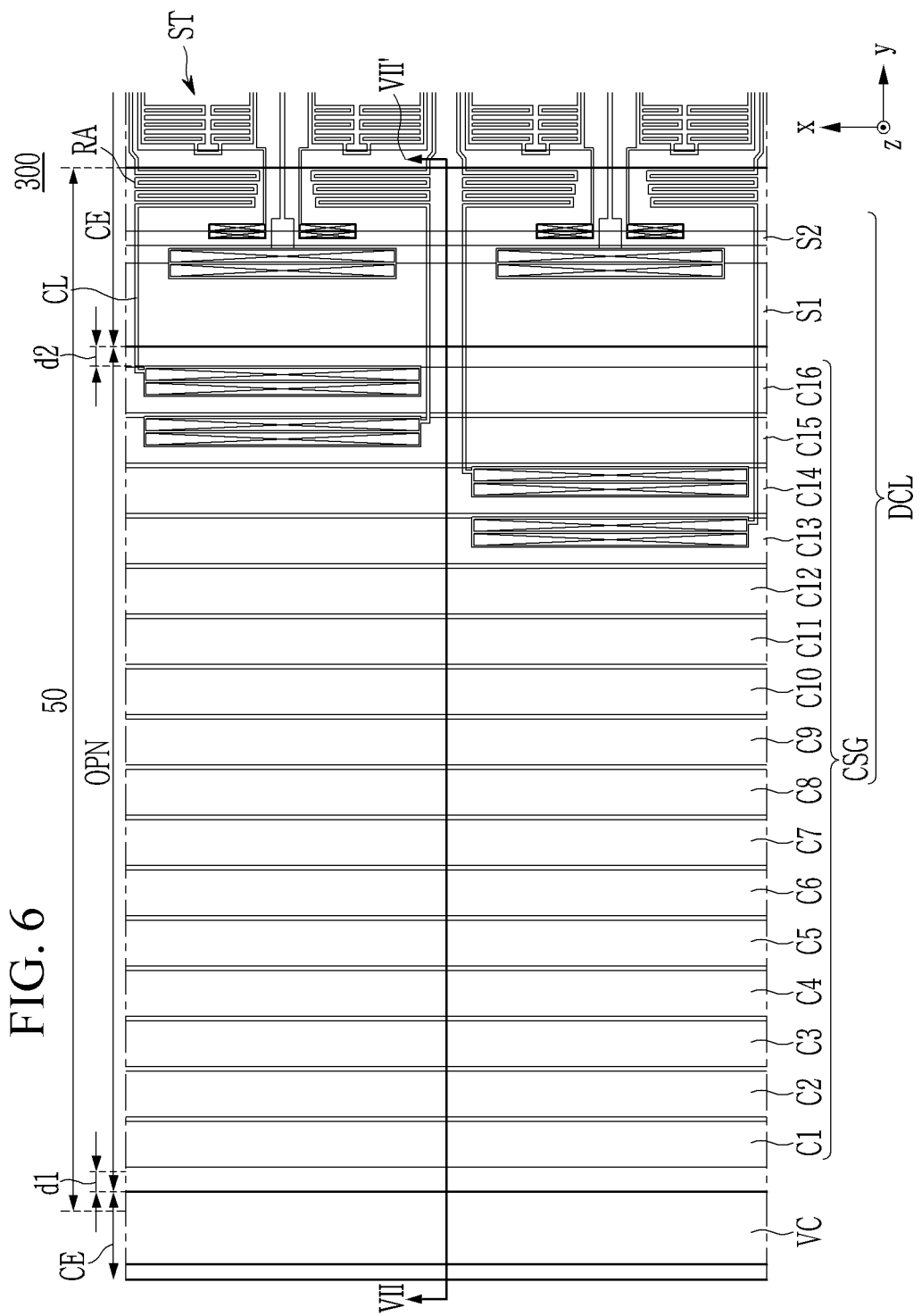
FIG. 6 illustrates an enlarged view of a region A of FIG. 1 according to an exemplary embodiment.
Figure 7:
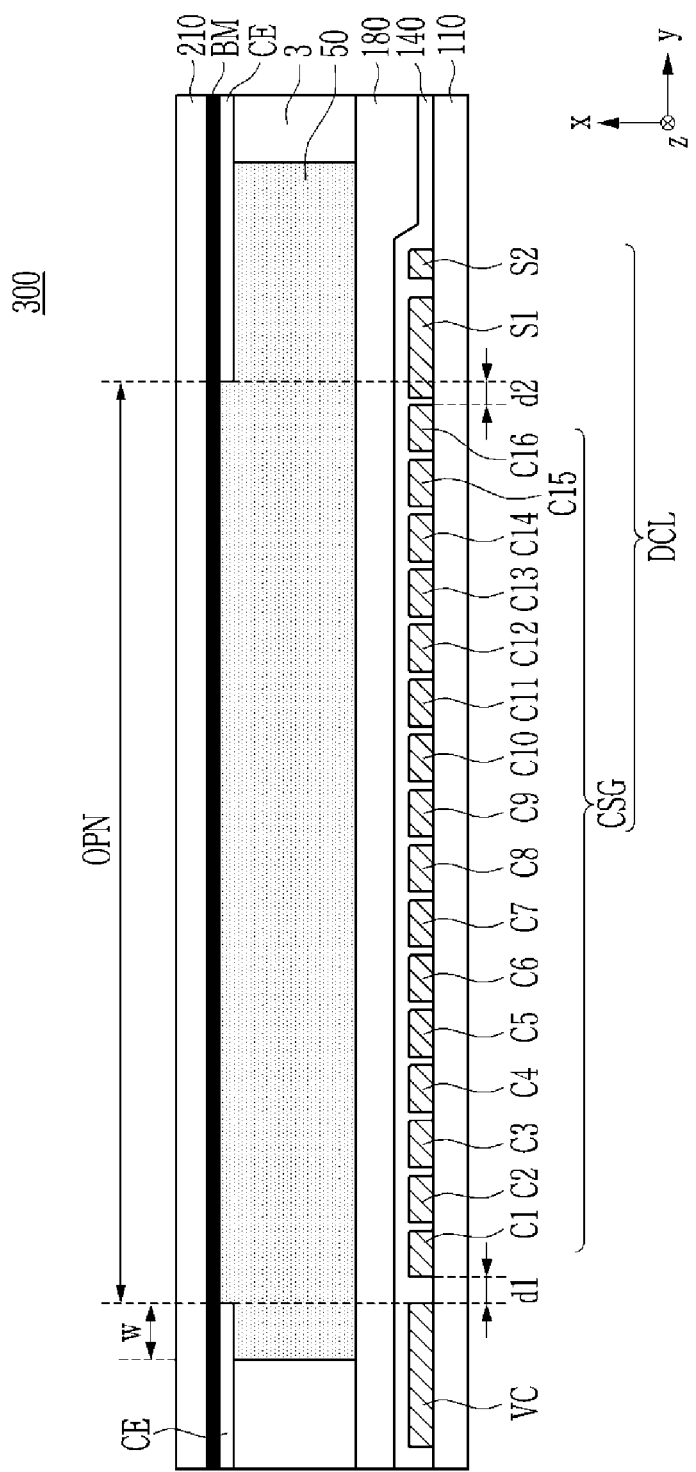
FIG. 7 illustrates a cross-sectional view taken along a line VII-VII' of FIG. 6.

FIG. 6 illustrates an enlarged view of a region A of FIG. 1 according to an exemplary embodiment, and FIG. 7 illustrates a cross-sectional view taken along a line VII-VII' of FIG. 6.

The exemplary embodiment of FIG. 6 and FIG. 7 is different from the aforementioned exemplary embodiment in a position of the resistance adjusting part RA. For example, the resistance adjusting part RA is between the signal line S2 configured to transfer the vertical start signal and the stages ST1 to STn. Accordingly, the clock signal line group CSG and the signal line S1 transferring a low voltage may be located more closely (e.g., located more closely to one another). The openings OPN formed in the common electrode CE do not overlap the clock signal line group CSG. The opening OPN may not overlap the signal line S2 configured to transfer a vertical start signal and the resistance adjusting part RA. The opening OPN may overlap a portion of the signal line S1 configured to transfer a low voltage, or may not overlap the signal line S1 for transferring the low voltage.

Figure 8:
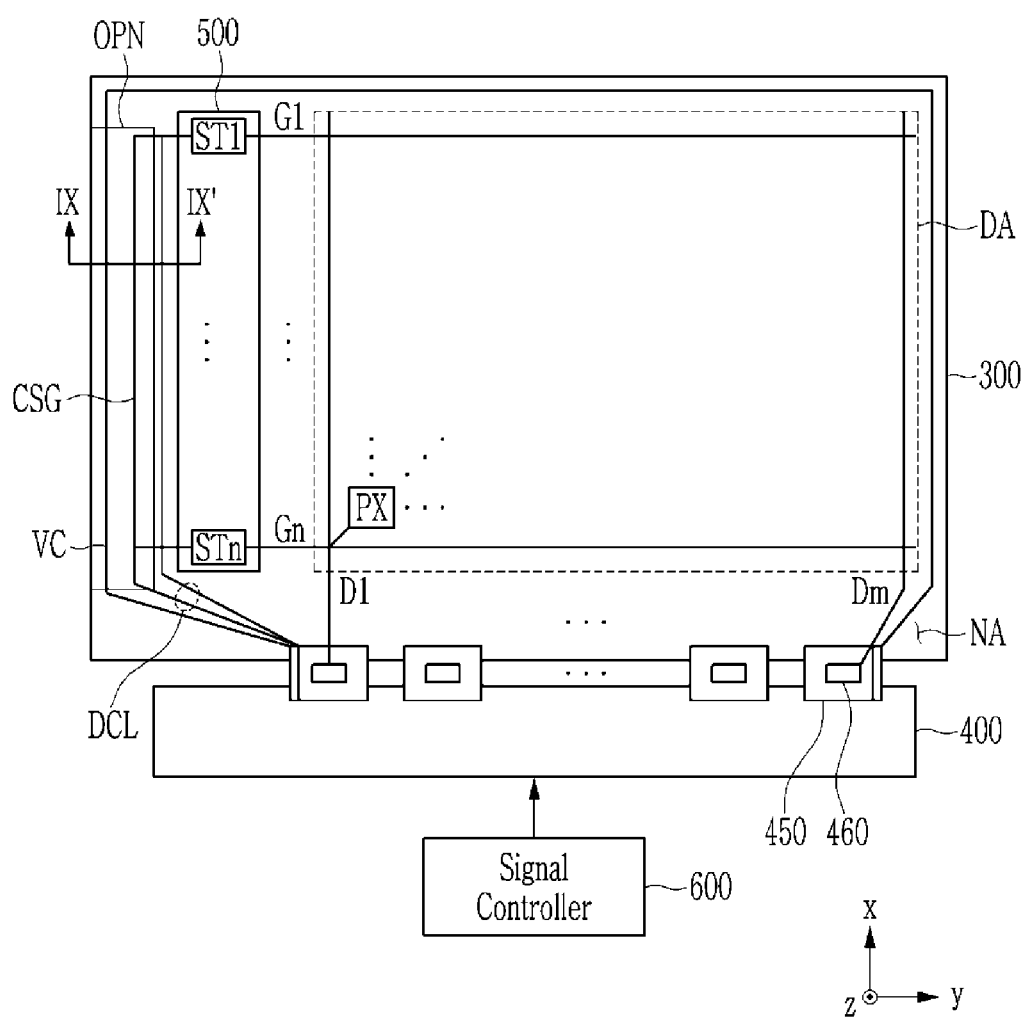
FIG. 8 schematically illustrates a display device according to an exemplary embodiment.
Figure 9:
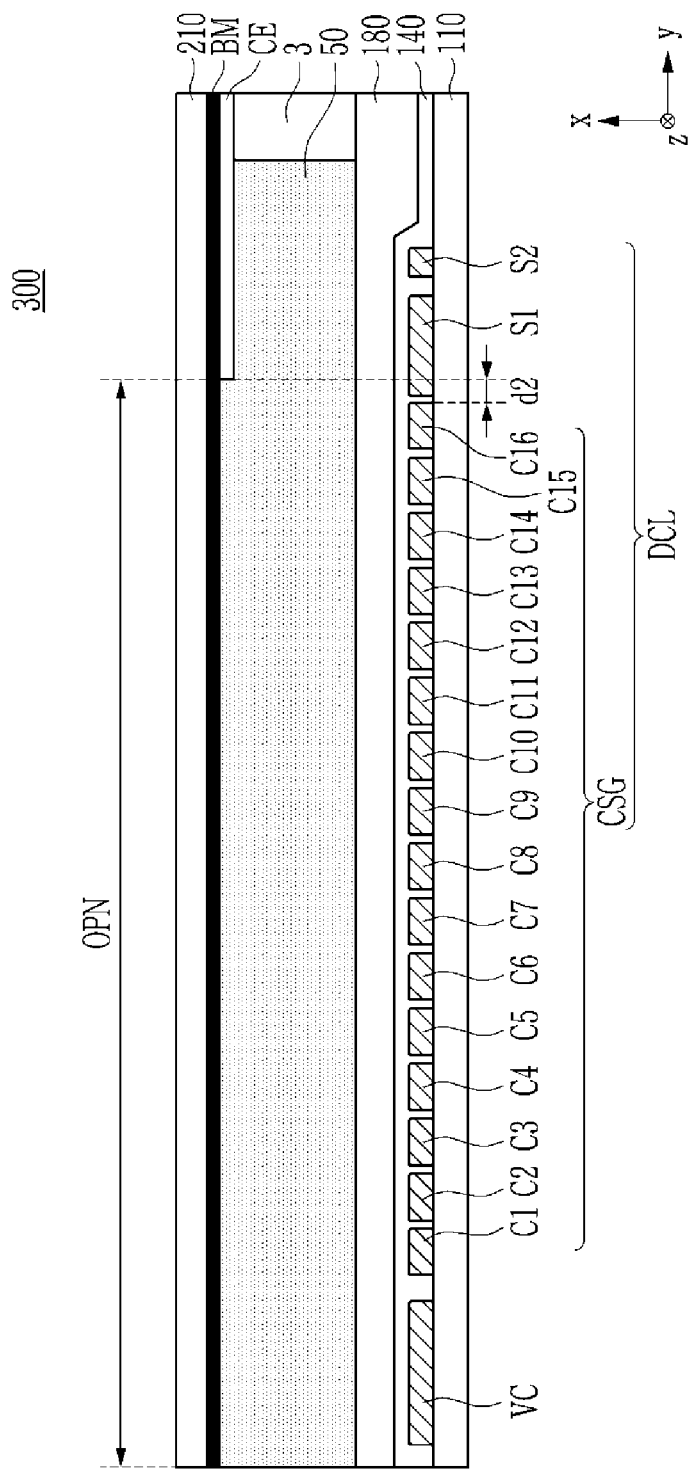
FIG. 9 illustrates a cross-sectional view taken along a line IX-IX' of FIG. 8.

FIG. 8 schematically illustrates a display device according to an exemplary embodiment, and FIG. 9 illustrates a cross-sectional view taken along a line IX-IX' of FIG. 8.

The exemplary embodiment of FIG. 8 and FIG. 9 is different from the aforementioned exemplary embodiment in a region of the opening OPN. For example, although the common electrode CE is also formed at a left side of the opening OPN in the aforementioned exemplary embodiment, the opening OPN is formed up to a left end of the second substrate 210 in the present exemplary embodiment. The common electrode CE on the second substrate 210 is electrically coupled to the common voltage line VC on the first substrate 210 through conductive particles in the sealant 50, and this connection may be performed above and/or below the display panel 300. Accordingly, even when the common electrode CE is not provided outside the opening OPN at a left or right side of the second substrate 210 as in the present exemplary embodiment, the common electrode CE may be electrically coupled to the common voltage line VC. Characteristics related to the opening OPN of the common electrode CE overlapping the clock signal line group CSG are the same as those of the above-described embodiment, and thus, a duplicative description thereof will not be repeated here.

Figure 10:
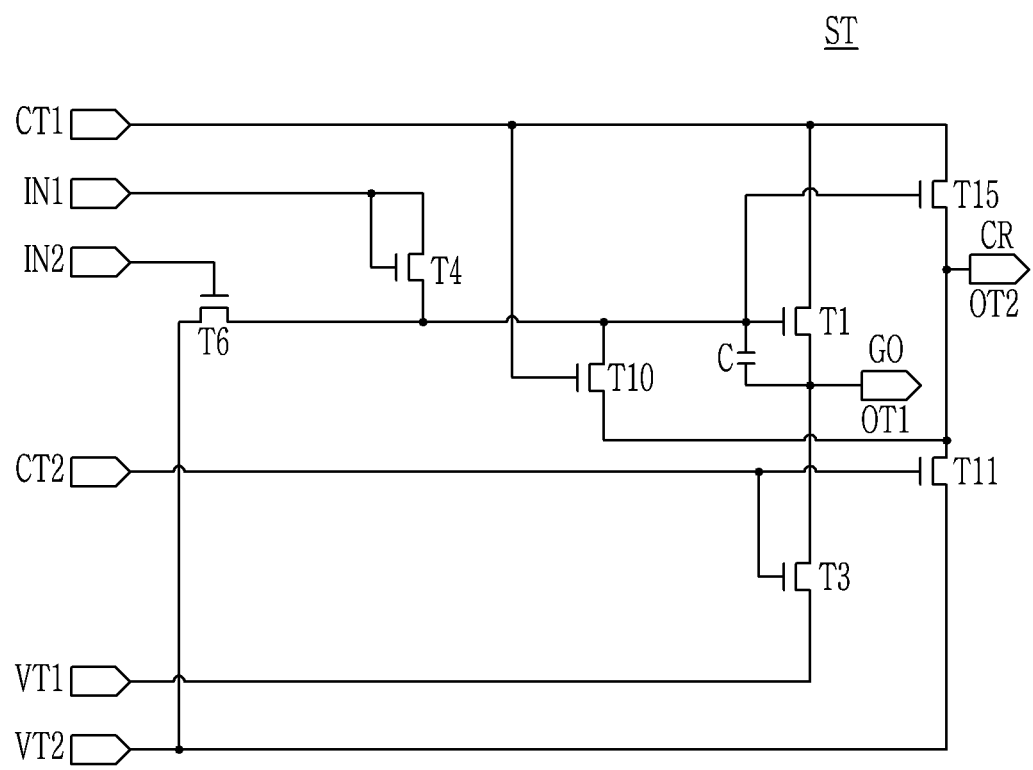
FIG. 10 illustrates a circuit diagram of a stage of a gate driver according to an exemplary embodiment.

FIG. 10 illustrates a circuit diagram of a stage of a gate driver according to an exemplary embodiment.

The stage ST may include input terminals and output terminals. For example, the stage ST may include a first clock terminal CT1, a second clock terminal CT2, a first input terminal IN1, a second input terminal IN2, a first voltage terminal VT1, a second voltage terminal VT2, a first output terminal OT1, and a second output terminal OT2.

The first clock terminal CT1 may be coupled to one clock signal line to receive a first clock signal, and the second clock terminal CT2 may be coupled to another clock signal line to receive a second clock signal having a phase that is opposite to that of the first clock signal. The first input terminal IN1 may be coupled to the second output terminal OT2 of a previous stage to receive a carry signal, and to the second input terminal IN2 of a next stage to receive a carry signal. The first stage may receive a vertical start signal through the first input terminal thereof since no previous stage exists for the first stage, and the last stage may receive a vertical start signal through the second input terminal IN2 since no next stage exists for the last stage. The first voltage terminal VT1 may be coupled to one low voltage signal line to receive a first low voltage, and the second voltage terminal VT2 may be coupled to another low voltage signal line to receive a second low voltage having a lower level than that of the first low voltage. The first output terminal OT1 may output a gate signal GO to a corresponding gate line. The second output terminal OT2 may output a carry signal CR.

The stage ST may include seven transistors T1, T3, T4, T6, T10, T11, and T15 and one capacitor C. This circuit may operate and function to receive the aforementioned signals and generate gate signals with good characteristics. The stage ST illustrated herein is merely an example. The stage ST may be configured to include additional transistors or to not include any transistors, the number and/or types (or kinds) of input and/or output terminals may be changed, and the signals inputted and/or outputted may vary.

Figure 11:
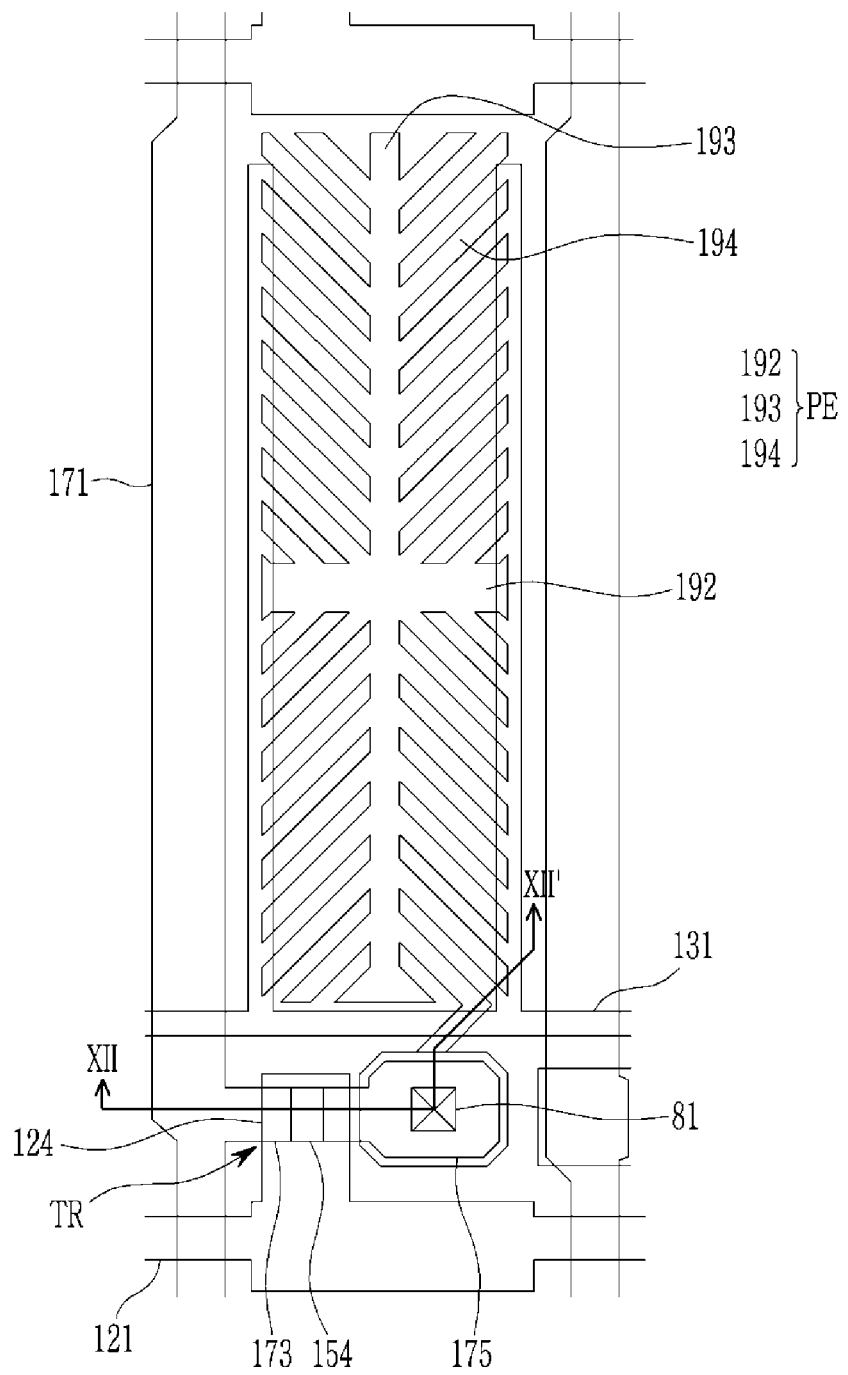
FIG. 11 illustrates a layout view of a pixel area of a display device according to an exemplary embodiment.
Figure 12:
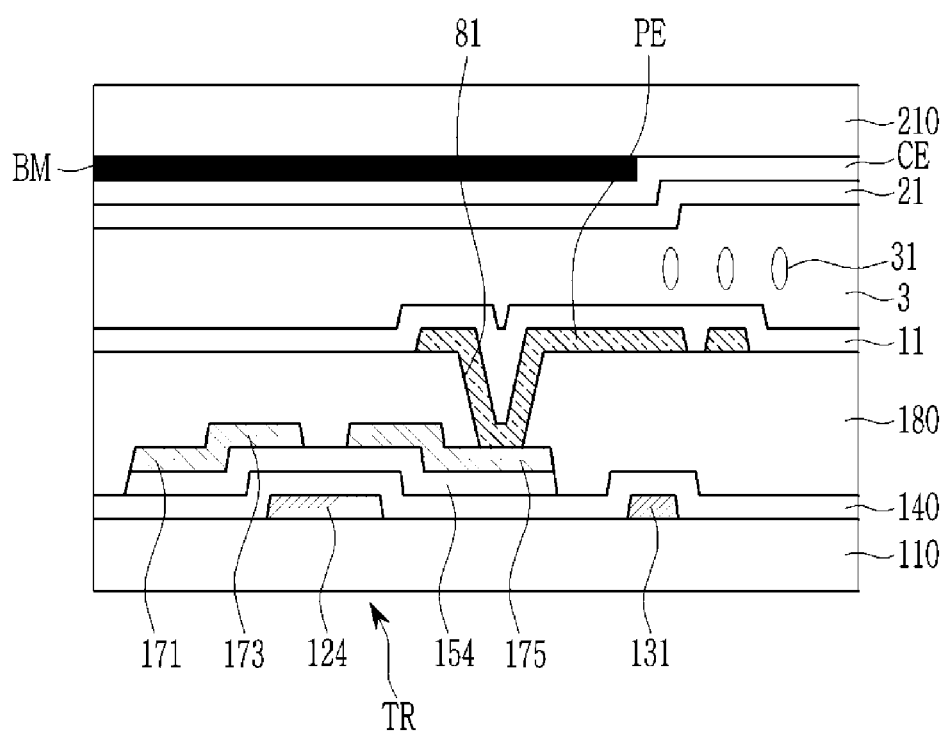
FIG. 12 illustrates a cross-sectional view taken along a line XII-XII' of FIG. 11.

FIG. 11 illustrates a layout view of a pixel area of a display device according to an exemplary embodiment, and FIG. 12 illustrates a cross-sectional view taken along a line XII-XII' of FIG. 11.

FIG. 11 illustrates one pixel area, which is a part of a plurality of pixel areas, and these pixel areas are arranged vertically and horizontally in the liquid crystal panel. FIG. 11 and FIG. 12 are for describing a pixel PX in the display area DA of the display panel 300, and FIG. 1 to FIG. 4 are referred to in order to describe a relationship with the non-display area NA of the display panel 300.

Referring to FIG. 11 and FIG. 12, a gate conductor including a gate line 121, a gate electrode 124, and a storage electrode line 131 is on the first substrate 110, which is a transparent insulation substrate made of glass or the like. The gate electrode 124 may protrude in one direction from the gate line 121. A portion of the storage electrode line 131 may serve as the second electrode of a storage capacitor. The gate conductor may include a metal such as molybdenum, aluminum, silver, copper, chromium, tantalum, titanium, or an alloy thereof. The gate conductor may be formed by forming a conductive layer on the first substrate 110 and then patterning it. The gate conductor may include the aforementioned driver control signal line DCL.

The first insulating layer 140, which may include an inorganic insulating material, is on the gate conductor. A semiconductor pattern 154 including a semiconductor layer of the transistor TR is on the first insulating layer 140. The semiconductor pattern 154 may include amorphous silicon, an oxide semiconductor, and the like. The semiconductor line 159 may be formed using a same process and a same material as those of the semiconductor pattern 154.

A data conductor including a data line 171, a first electrode 173 of the transistor TR, and a second electrode 175 is on the semiconductor pattern 154. An ohmic contact may be between the semiconductor pattern 154 and the data line 171, the first electrode 173, and the second electrode 175. A channel of the transistor TR is formed in a portion between the first electrode 173 and the second electrode 175 in the semiconductor pattern 154. The data conductor may include a metal such as molybdenum, chromium, copper, aluminum, tantalum, titanium, or an alloy thereof. The semiconductor pattern 154 and the data conductor may be formed by stacking a semiconductor layer and a conductive layer on the first insulating layer 140 and then patterning the same. The data conductor may include the aforementioned connection line CL.

The second insulating layer 180, which may include an organic insulating material and/or an inorganic insulating material, is on the data conductor. The second insulating layer 180 may be a multilayer, and one layer may be a color filter.

A pixel electrode PE, which may include a horizontal stem 192, a vertical stem 193, and a branch 194 is on the second insulating layer 180. The pixel electrode PE may be coupled to the second electrode 175 through a contact hole 81 formed in the second insulating layer 180. The pixel electrode PE may include a transparent conductive material such as ITO and IZO. The connector 199 may be formed using a same process and a same material as those of the pixel electrode PE.

When the transistor TR is turned on by the gate-on voltage applied through the gate line 121, the pixel electrode PE may receive a data voltage applied through the data line 171 to charge the pixel PX with the data voltage.

The second substrate 210, which may be a transparent insulating substrate, may be formed on the pixel electrode PE.

A light-blocking member BM that covers the transistor TR is on the second substrate 210, and a common electrode CE configured to receive a common voltage is on the light-blocking member BM. The common electrode CE may include a transparent conductive material such as ITO and IZO. The common electrode CE may be arranged to be entirely over the second substrate 210, but may not be located at least in a region overlapping the clock signal line group CSG described above. For example, the common electrode CE includes an opening OPN in a region overlapping the clock signal line group CSG.

The liquid crystal layer 3 including liquid crystal molecules 31 is between the first substrate 110 and the second substrate 210. An orientation of the liquid crystal molecules 31 may be controlled by an electric field generated by a voltage applied to the pixel electrode PE and the common electrode CE, to express a gray by controlling polarization of incident light.

Alignment layers 11 and 21 are between the pixel electrode PE and the liquid crystal layer 3 and between the common electrode CE and the liquid crystal layer 3. The alignment layers 11 and 21 may control an initial orientation of the liquid crystal molecules 31 when no electric field is generated in the liquid crystal layer 3.

While the subject matter of the present disclosure been described in connection with what is presently considered to be practical exemplary embodiments, it is to be understood that the subject matter of the present disclosure is not limited to the disclosed embodiments, but, on the contrary, is intended to cover various modifications and equivalent arrangements included within the spirit and scope of the appended claims, and equivalents thereof.

What is claimed is:

1. A display device comprising:
a display panel comprising a display area in which a plurality of pixels are arranged, and a non-display area around the display area,
wherein the display panel comprises:
a first substrate;
a plurality of gate lines on the first substrate, the plurality of gate lines being configured to transfer gate signals to the pixels;
a gate driver on the first substrate, the gate driver comprising a plurality of stages configured to generate the gate signals to output them to the gate lines;
a clock signal line group on the first substrate and comprising a plurality of clock signal lines configured to transmit clock signals to the stages;
a second substrate facing the first substrate; and
a common electrode on the second substrate,
wherein the common electrode has an opening overlapping the clock signal line group, and a width of the opening is greater than that of the clock signal line group.

2. The display device of claim 1, wherein:
the opening overlaps a portion of the clock signal line group that extends in parallel with the gate driver.

3. The display device of claim 2, wherein:
the opening has a rectangular shape having a long side that extends in parallel with the gate driver.

4. The display device of claim 2, wherein:
the gate driver extends in a first direction, and the clock signal lines are separated by a set interval in a second direction that intersects the first direction, and
a distance in the second direction between the common electrode and a clock signal line farthest from the gate driver among the clock signal lines is 20 μm or more.

5. The display device of claim 4, wherein:
a distance in the second direction between the common electrode and the clock signal line closest to the gate driver among the clock signal lines is 20 μm or more.

6. The display device of claim 1, wherein:
the display panel further comprises a sealant between the first substrate and the second substrate and bonding the first substrate and the second substrate, and
the sealant completely covers the opening.

7. The display device of claim 6, wherein:
the display panel further comprises a light blocking member on the second substrate,
the light blocking member overlaps the opening and has a width that is greater than that of the opening.

8. The display device of claim 7, wherein:
the light blocking member is between the second substrate and the common electrode, and
a top surface of the sealant contacts the light blocking member in a region where the sealant overlaps the opening.

9. The display device of claim 8, wherein:
the display panel further comprises a liquid crystal layer between the first substrate and the second substrate, and
the liquid crystal layer is separated from the opening.

10. The display device of claim 1, wherein:
the display panel further comprises a plurality of connection lines coupling the clock signal lines and the stages, and
at least one of the connection lines comprises a resistance adjusting part between the clock signal line group and the gate driver.

11. The display device of claim 10, wherein:
the display panel further comprises a signal line that transfers a low voltage to the gate driver, and
the resistance adjusting part is between the clock signal line group and the signal line.

12. The display device of claim 1, wherein:
the opening is formed up to one end of the second substrate.

13. A display device comprising:
a first substrate;
a gate driver longitudinally arranged on the first substrate in a first direction, the gate driver being configured to generate and output a gate signal;
a clock signal line group comprising a plurality of clock signal lines on the first substrate and extending in the first direction;
a second substrate facing the first substrate;
a common electrode on the second substrate and having an opening; and
a liquid crystal layer between the first substrate and the second substrate,
wherein a width of the opening is greater than that of the clock signal line group in a second direction that intersects the first direction.

14. The display device of claim 13, wherein:
the opening overlaps the clock signal line group.

15. The display device of claim 14, wherein:
the opening overlaps a portion of the clock signal line group that extends in parallel with the gate driver in the first direction.

16. The display device of claim 15, wherein:
the opening has a rectangular shape having a long side that extends in the first direction.

17. The display device of claim 13, wherein:
a distance in the second direction between the common electrode and the clock signal line farthest from the gate driver among the clock signal lines is 20 μm or more, and
a distance in the second direction between the common electrode and the clock signal line closest to the gate driver is 20 μm or more.

18. The display device of claim 13, further comprising:
a sealant bonding the first substrate and the second substrate, wherein the sealant completely covers the opening.

19. The display device of claim 18, further comprising:
a light blocking member between the second substrate and the common electrode,
wherein the light blocking member overlaps the opening.

20. The display device of claim 19, wherein:
a top surface of the sealant contacts the light blocking member in a region where the sealant overlaps the opening.

* * * * *